United States Patent [19]
Toyoda et al.

[11] Patent Number: 5,987,263
[45] Date of Patent: Nov. 16, 1999

[54] CAMERA

[75] Inventors: Yasuhiro Toyoda, Ohmiya; Yoshinobu Shibayama, Kawasaki, both of Japan

[73] Assignee: Canon Kabushiki Kaisha, Tokyo, Japan

[21] Appl. No.: 08/788,083

[22] Filed: Jan. 22, 1997

[30] Foreign Application Priority Data

Jan. 30, 1996 [JP] Japan .................................. 8-014304
Jan. 31, 1996 [JP] Japan .................................. 8-015314

[51] Int. Cl.⁶ ............................................... G03B 15/03
[52] U.S. Cl. ...................................... 396/178; 396/534
[58] Field of Search .................................. 396/530, 534, 396/176, 177, 178, 348

[56] References Cited

U.S. PATENT DOCUMENTS

| | | | |
|---|---|---|---|
| 4,245,903 | 1/1981 | Hazama et al. | 354/86 |
| 4,819,016 | 4/1989 | Leonard et al. | 396/178 |
| 5,264,884 | 11/1993 | Michaud | 396/178 |
| 5,485,234 | 1/1996 | Stephenson, III et al. | 196/178 |
| 5,794,084 | 8/1998 | Ikari | 396/448 |

FOREIGN PATENT DOCUMENTS 5687029  7/1981  Japan .
214032  4/1990  Japan .

OTHER PUBLICATIONS

Patent Abstracts of Japan No. JP 63 103217 A, published May 7, 1988.
Patent Abstracts of Japan No. JP 56 087029 A, published Jul. 15, 1981.
Patent Abstracts of Japn No. JP 61 284739 A, published Dec. 15, 1986.

*Primary Examiner*—Safet Metjahic
*Assistant Examiner*—Michael Dalakis
*Attorney, Agent, or Firm*—Robin, Blecker & Daley

[57] ABSTRACT

A camera comprises a photographing optical system, and a cover for covering the photographing optical system, and the cover is supported turnably about a rotating axis which is neither parallel nor perpendicular to a longitudinal direction of a camera body, and is operative to selectively open and close by turning about the rotating axis. Part of the cover is positioned by coming into abutment with part of a front exterior portion of the camera, so that the cover is held in a predetermined opened state. The cover is provided with a flash device, and when the cover is in an opened state, the flash device is moved away from the photographing optical system so that a red-eye phenomenon is prevented from easily occurring.

28 Claims, 9 Drawing Sheets

CAMERA

BACKGROUND OF THE INVENTION

1. Field of the Invention

The present invention relates to a camera having a flash device for flash photography.

2. Description of Related Art

A conventional camera which is provided with a barrier for protecting a lens and the like at the front of the camera has been proposed in Japanese Laid-Open Patent Application No. Sho 56-87029 and the like. The barrier is turnably secured to the camera body of the camera via bearing means having an axis of rotation extending in a direction approximately perpendicular to the central axis of the lens, and a flash device is incorporated in the interior of the barrier. The camera is arranged so that photography is possible when the barrier is opened.

However, in the conventional camera, since a rotating shaft is disposed at the top end of the camera body, when the barrier is brought to an opened state, the barrier projects upwardly from the camera body, so that if the barrier is forced in an opening direction from the front side of the camera body, a greater part of the force acts on the rotating shaft. Accordingly, it has been necessary to impart a very high strength to a component which forms the rotating shaft.

In addition, the rotation stop position of the barrier must be limited (positioned) so that the angle of illumination of the flash device and the required area of a subject to be illuminated coincide with each other when the barrier is in the opened state. However, since the barrier projects upwardly from the camera body when in the opened state, i.e., there is no portion which comes into direct abutment with the camera body, it is necessary to provide a rotation limiting portion (a stopper for positioning) for the rotating shaft of the barrier.

In the case of the conventional camera, since there is no choice but to provide the aforesaid rotation limiting portion near the rotating shaft, the distance from the center of rotation of the rotating shaft to the rotation limiting portion becomes short, so that the limiting accuracy of the rotation limiting position becomes low. As a result, the angle of flash illumination must be set to a wide illuminating angle containing a considerable margin which allows for variations in the amount of rotation of the barrier, so that the amount of light which can reach the required area of the subject to be illuminated becomes small relative to the amount of light which can be radiated from the flash device.

BRIEF SUMMARY OF THE INVENTION

One object of the present invention is to realize, by using a simple arrangement, a camera which is capable of accurately positioning a cover for covering a photographing optical system, when the cover is in a predetermined opened state.

To achieve the above object, in accordance with one aspect of the present invention, there is provided a camera which comprises a photographing optical system and a cover for covering the photographing optical system, the cover being supported turnably about a rotating axis which is neither parallel nor perpendicular to a longitudinal direction of a camera body, and being operative to selectively open and close by turning about the rotating axis.

Another object of the present invention is to realize a camera in which a flash device is provided in a cover for covering a photographing optical system, in such a manner that a red-eye phenomenon can be prevented from easily occurring.

To achieve the above object, in accordance with another aspect of the present invention, there is provided a camera which comprises a photographing optical system, a cover which covers the photographing optical system and which has a recess portion for accommodating part of the photographing optical system which partially projects from a camera body, the cover being supported turnably with respect to the camera body and being operative to selectively open and close by turning, and a flash device for flash photography, provided in the cover, the flash device being disposed at a position where a distance from the photographing optical system to the flash device is greater than a distance from the photographing optical system to the recess portion when the cover is in an opened state.

Another object of the present invention is to realize, by using a simple arrangement, a camera which is capable of accurately positioning a cover for covering a photographing optical system, when the cover is in a predetermined opened state.

To achieve the above object, in accordance with another aspect of the present invention, there is provided a camera which comprises a photographing optical system, and a cover for covering the photographing optical system, the cover being operative to selectively open and close by turning, and being positioned at a predetermined turning position where the cover is placed in an opened state, by coming into abutment with at least part of a front surface of a camera body.

The above and other objects, features and advantages of the present invention will become apparent from the following detailed description of preferred embodiments of the present invention, taken in conjunction with the accompanying drawings.

DETAILED DESCRIPTION OF THE INVENTION (First Embodiment)

Figure 1:
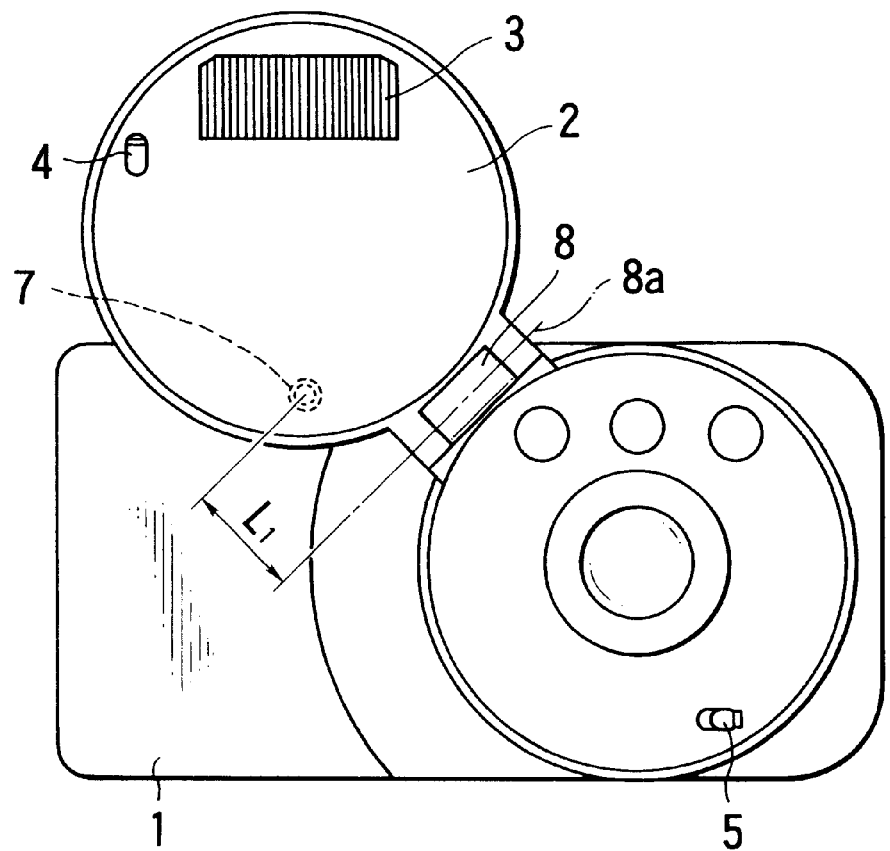
FIG. 1 is a front elevational view of a first embodiment, showing a camera with a rotatable barrier, in which a flash device is incorporated, being opened.
Figure 2:
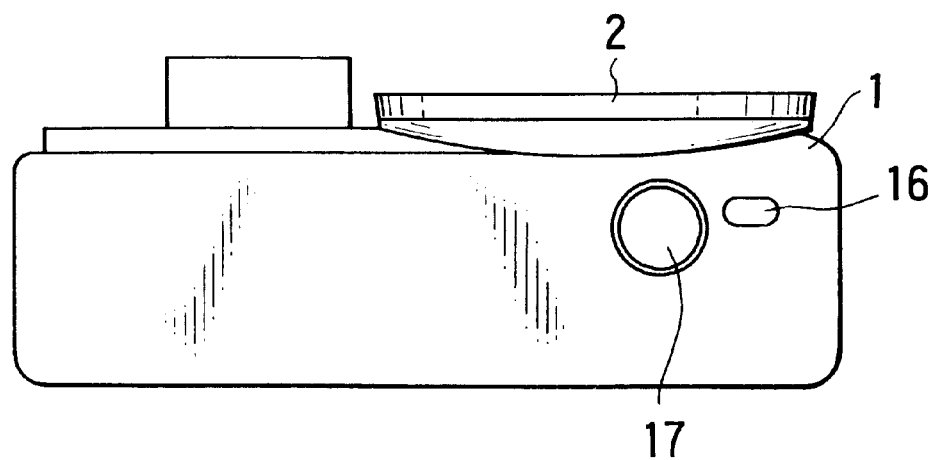
FIG. 2 is a top plan view of the first embodiment, showing the camera with the rotatable barrier, in which the flash device is incorporated, being opened.
Figure 3:
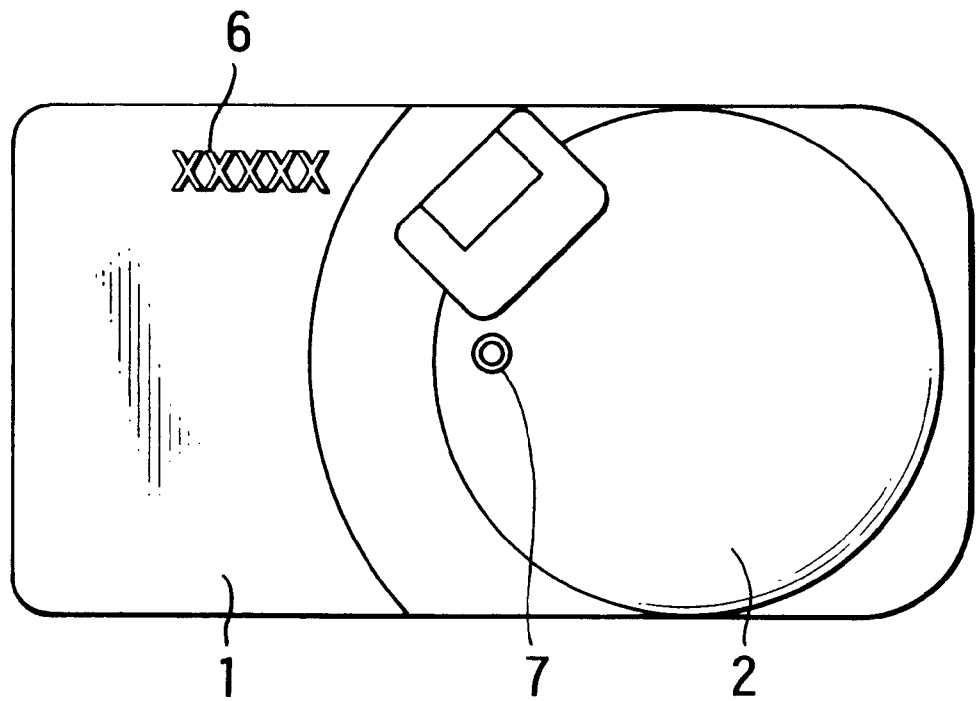
FIG. 3 is a front elevational view of the first embodiment, showing the camera with the rotatable barrier, in which the flash device is incorporated, being closed.
Figure 4:
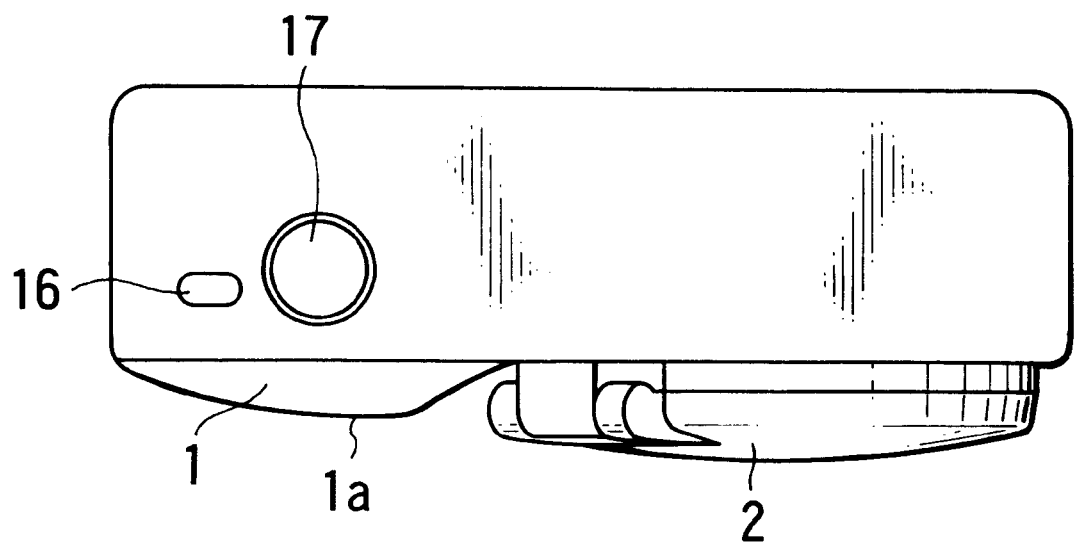
FIG. 4 is a top plan view of the first embodiment, showing the camera with the rotatable barrier, in which the flash device is incorporated, being closed.
Figure 5:
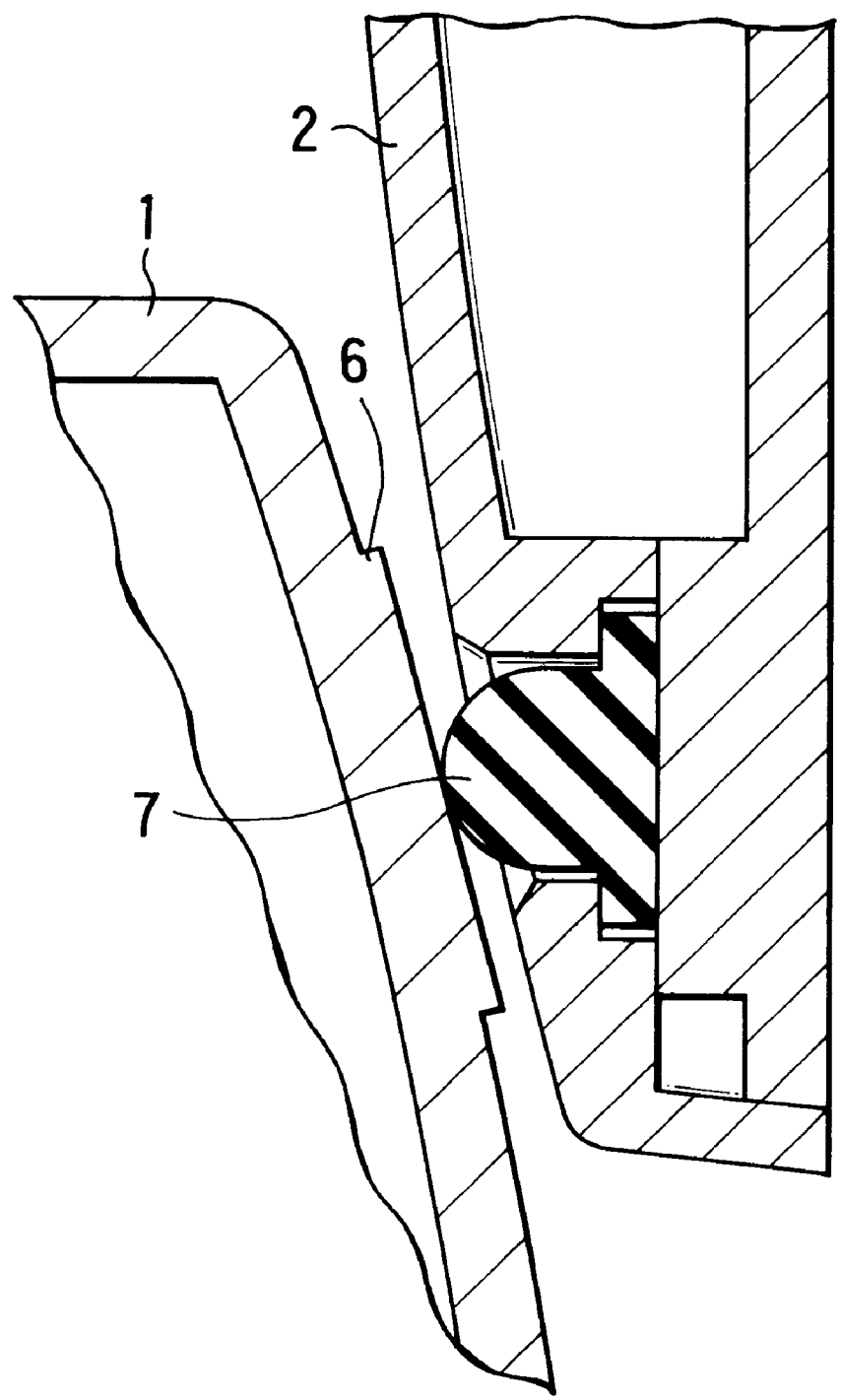
FIG. 5 is an enlarged cross-sectional view showing an abutment portion in which the rotatable barrier and the front of the camera come into abutment with each other.
Figure 6:
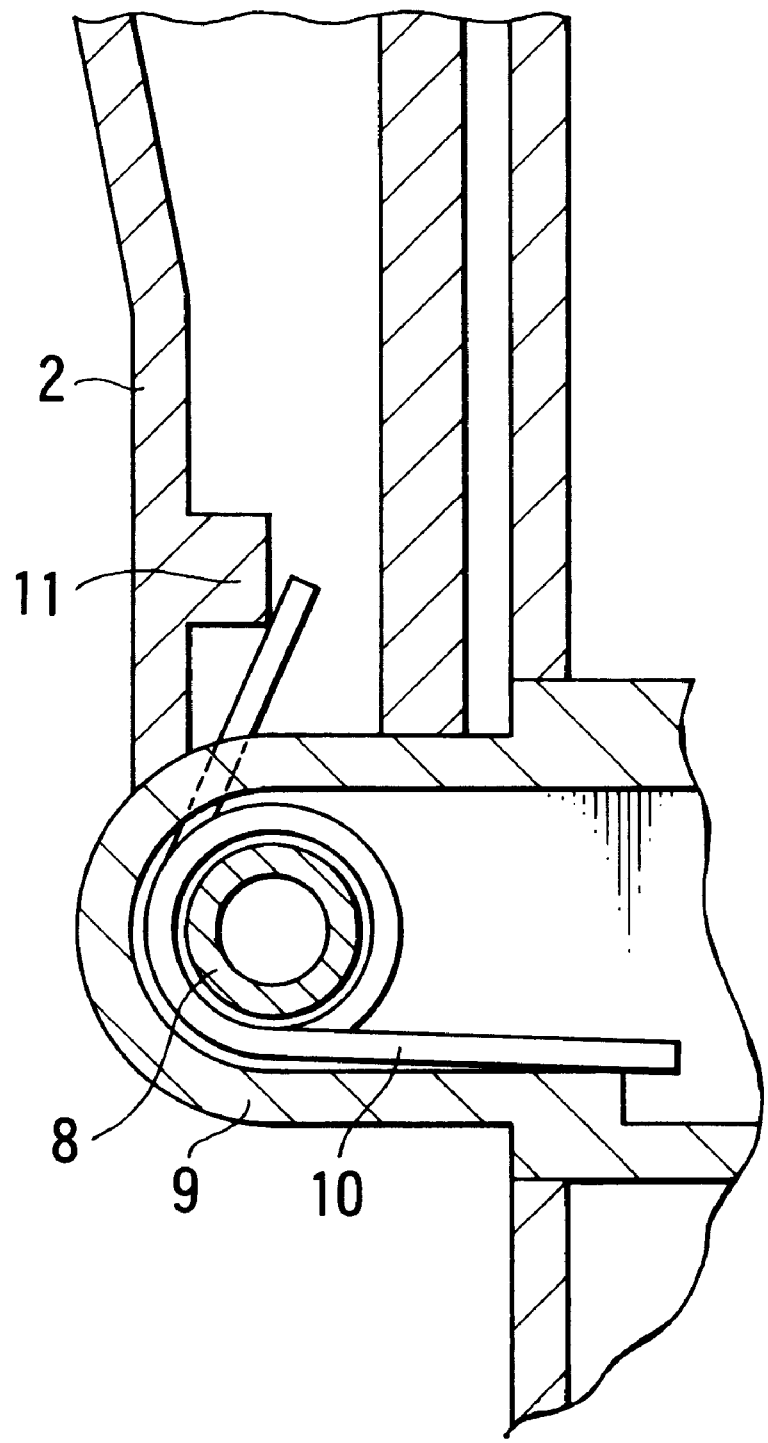
FIG. 6 is a diagrammatic cross-sectional view of a rotating shaft of the rotatable barrier of the first embodiment.
Figure 7:
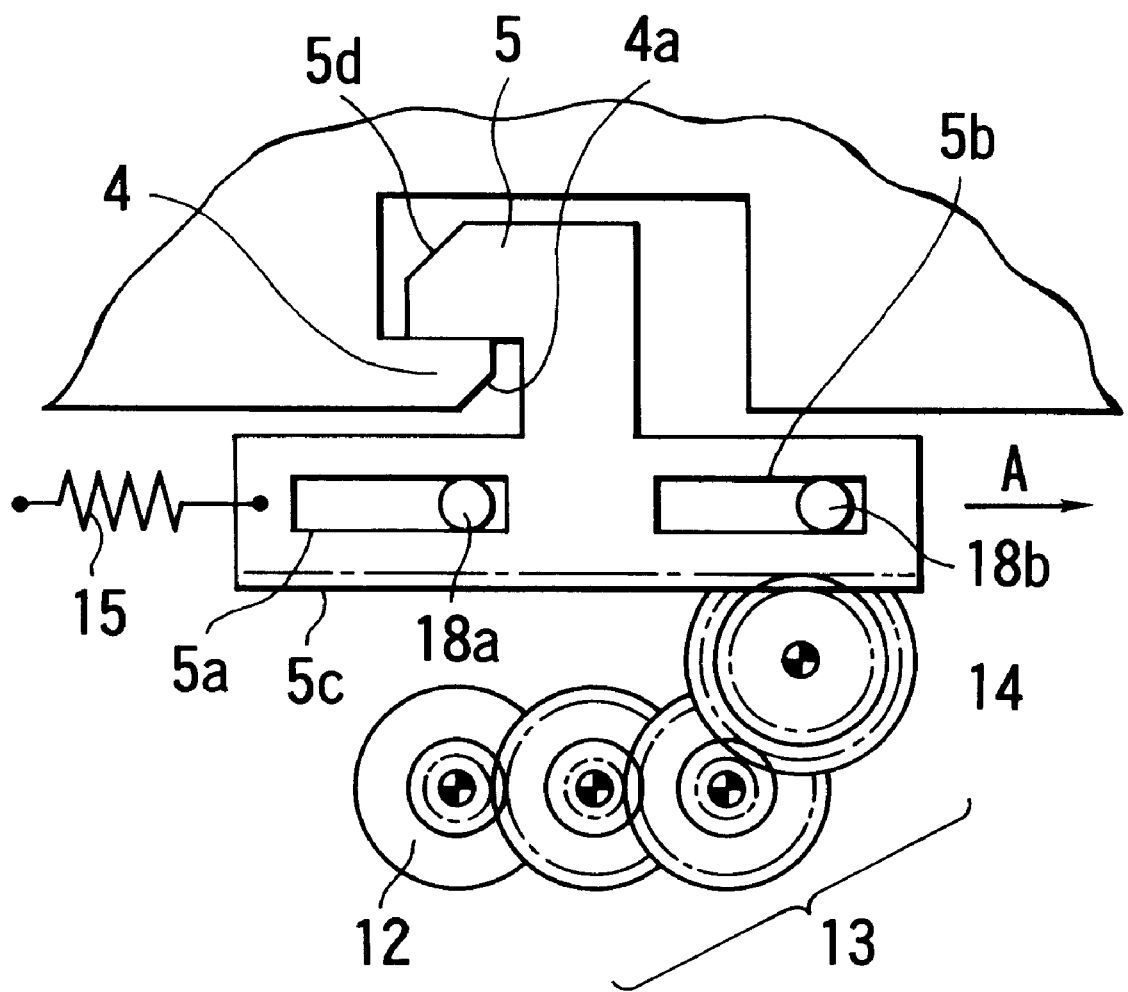
FIG. 7 is a diagrammatic view showing an engagement mechanism with the rotatable barrier of the first embodiment being closed.

FIGS. 1 to 7 show a camera according to a first embodiment of the present invention. FIG. 1 is a front elevational view showing the camera with a rotatable barrier, in which a flash device is incorporated, being opened, FIG. 2 is a top plan view showing the camera with the rotatable barrier, in which the flash device is incorporated, being opened, FIG. 3 is a front elevational view showing the camera with the rotatable barrier being closed, FIG. 4 is a top plan view showing the camera with the rotatable barrier being closed, FIG. 5 is an enlarged cross-sectional view showing an abutment portion in which the rotatable barrier and the front of the camera come into abutment with each other, FIG. 6 is a diagrammatic cross-sectional view of a rotating shaft of the rotatable barrier, and FIG. 7 is a diagrammatic view showing an engagement mechanism with the rotatable barrier being closed.

A front cover 1 which covers the camera body of the camera is provided with a grip portion at which to hold the camera during photography, and the grip portion is formed in the shape of a cubic surface which is a surface curved in both the vertical and horizontal directions. A rotatable barrier 2 operative to selectively cover and uncover a photographing lens and others is disposed on a top portion of the front cover 1 in such a manner that a position at which the rotatable barrier 2 is secured to the camera body is displaced toward the grip portion from a position directly above the center axis of the photographing lens. An axis 8a of a rotating shaft 8 of the rotatable barrier 2 relative to the camera body is disposed in an inclined state below the top end of the front cover 1. A flash emission part 3 is incorporated in the interior of the rotatable barrier 2.

Referring to FIG. 6, a rotation bearing 9 is provided on the camera body, and a barrier opening spring 10 serves to urge the rotatable barrier 2 in the opening direction between the rotation bearing 9 and a projection 11 provided on the internal side of the rotatable barrier 2.

FIG. 7 shows an engagement mechanism for providing engagement between an engagement groove 4 for engaging the rotatable barrier 2 with the camera body when the rotatable barrier 2 is closed and an engagement claw 5 which is provided on the camera body and with which the engagement groove 4 comes into engagement. The engagement claw 5 is urged in the engaging direction at all times by an urging spring 15. Slide guide slots 5a and 5b formed in the body portion of the engagement claw 5 are respectively supported and guided by guide pins 18a and 18b provided on the camera body, so that the engagement claw 5 can be moved in the disengaging direction to disengage from the engagement groove 4.

A rack 5c is provided on part of the engagement claw 5 so that transmission of power in the disengaging direction can be effected. A motor 12 is arranged to generate power which releases the engagement between the engagement claw 5 and the engagement groove 4, and a speed reducing gear train 13 is disposed between the motor 12 and the engagement claw 5. A two-speed gear assembly 14 is arranged to transmit the power from the speed reducing gear train 13 to the rack 5c of the engagement claw 5. The two-speed gear assembly 14 includes two gears, one for a high speed and the other for a low speed, and the respective high- and low-speed gears mesh with the rack 5c and the speed reducing gear train 13. An absorbing spring (not shown) is incorporated between the high- and low-speed gears, and the power generated by the motor 12 is transmitted to the rack 5c against the urging force of the urging spring 15, but if the engagement claw 5 is directly moved in the disengaging direction from the engagement groove 4, the reverse movement of the engagement claw 5 is absorbed by the absorbing spring (not shown), so that this reverse movement is prevented from being transmitted to the low-speed gear of the two-speed gear assembly 14.

Referring to FIGS. 3 and 4, an impress portion 6 whose surface is flat and which indicates the name of the camera or the like is provided on a front curved surface 1a of the front cover 1. A cushion rubber 7 is incorporated in the rotatable barrier 2 in the state of being exposed on the front external surface of the rotatable barrier 2, and is placed in abutment with the impress portion 6 on the front side of the front cover 1 when the rotatable barrier 2 is opened.

The camera also includes a main switch 16 for opening the rotatable barrier 2 and starting the operation of the camera, and a release switch 17 for causing the camera to perform a photographing operation.

The operation of the rotatable barrier 2 in the embodiment having the above-described arrangement will be described below.

First, if the main switch 16 shown in FIG. 4 is turned on when the rotatable barrier 2 is in the closed state shown in FIGS. 3 and 4, the motor 12 in the arrangement shown in FIG. 7 is energized by a control circuit (not shown) of the camera. The rotation of the motor 12 is transmitted to the rack 5c through the speed reducing gear train 13 and the two-speed gear assembly 14, so that the engagement claw 5 moves in the direction of an arrow A to disengage from the engagement groove 4, by being guided by the guide slots 5a and 5b and the guide pins 18a and 18b.

When the engagement between the engagement groove 4 and the engagement claw 5 is released, the rotatable barrier 2 starts to rotate in the opening direction by the urging force of the barrier opening spring 10. The rotatable barrier 2 which has started to rotate comes to a stop when the tip of the cushion rubber 7 strikes on the surface of the impress portion 6 of the front cover 1. The motor 12 is stopped in response to a detection output from a position detecting switch (not shown) for the engagement claw 5.

The above-described state is shown in FIGS. 1 and 2. Then, if the release switch 17 is operated, a photographing operation is performed.

While the camera is being used or carried with the rotatable barrier 2 opened, if the rotatable barrier 2 is accidentally forced backward from the front side of the camera, the entire force is applied to the rotating shaft 8 of the rotatable barrier 2 in the case of the conventional example. In contrast, in the case of the first embodiment, the force is first applied to the cushion rubber 7 and is relaxed by the elastic deformation of the cushion rubber 7, and the cushion rubber 7 is located a predetermined distance $L_1$ away from the center of rotation of the rotating shaft 8. Accordingly, it is possible to reduce the forces applied to the rotating shaft 8 of the rotatable barrier 2 and the rotation bearing 9.

In addition, since the front curved surface 1a of the front cover 1 is a cubic surface which is a surface curved in both the vertical and horizontal directions, the impress portion 6 is formed as a flat portion serving as an abutment surface, so that, in the manufacturing step of limiting the rotation stop position of the rotatable barrier 2, positioning of a rotation stop limiting portion can readily be effected, and the accuracy of the angle of rotation can readily be ensured and adjustment of the angle of rotation can be facilitated.

Specifically, regarding the abutment between the front curved surface 1a and the front curved surface of the cushion rubber 7, since errors are liable to occur between the design values and the actual values of the heights of their respective abutment portions, it is very difficult to restrict the point of abutment for each actual product during manufacture. In the manufacturing step of correcting the abutment surface of the camera body, it is impossible to partially correct the curvature of the front curved surface 1a. However, in the first embodiment, since the impress portion 6 is formed as a flat projecting portion, it is very easy to perform post-correction of the abutment surface. This limitation of the stop position of the rotatable barrier 2 makes it possible to reduce the margin of the angle of flash illumination, so that the amount of light of the flash device can be effectively projected onto a subject.

After the completion of the photographing operation, when the rotatable barrier 2 is manually moved in the closing direction, the engagement groove 4 and the engagement claw 5 are brought into engagement with each other, so that the rotatable barrier 2 is held at its initial position by the engagement.

Incidentally, after the rotatable barrier 2 has been opened, the aforementioned control circuit of the camera energizes the motor 12 in the reverse direction and the engagement claw 5 is returned to its engagement position.

Specifically, the power of the motor 12 is transmitted to the two-speed gear assembly 14 via the speed reducing gear train 13, but the high- and low-speed gears of the two-speed gear assembly 14 are constructed to transmit the power from the low-speed gear to the high speed gear in only one direction (in the clockwise direction as viewed in FIG. 7), so that the power is transmitted to the engagement claw 5 in the opening direction only. When the motor 12 is energized in the reverse direction, the low-speed gear rotates so that the engagement claw 5 moves in the closing direction, but the high-speed gear loses a force which moves and engages the engagement claw 5 in the opening direction. Accordingly, the engagement claw 5 is guided by the guide slots 5a and 5b and the guide pins 18a and 18b and is returned in the closing direction with the rotatable barrier 2 remaining open, by the spring force of the urging spring 15.

The aforesaid reverse energization of the motor 12 is stopped under time control. If the rotatable barrier 2 is manually moved in the closing direction, an inclined surface 4a of the engagement groove 4 of the rotatable barrier 2 and an inclined surface 5d of the engagement claw 5 come into abutment with each other. If the rotatable barrier 2 is moved further in the closing direction, the engagement claw 5 moves in the direction of the arrow A against the urging spring 15 while being guided by the guide slots 5a and 5b and the guide pins 18a and 18b. During this time, the rotation of the high-speed gear is not prevented from being transmitted to the low-speed gear, owing to the absorbing spring incorporated in the two-speed gear assembly 14. When the rotatable barrier 2 is brought to its completely closed state in this manner, the tip of the engagement claw 5 drops into the engagement groove 4 and is then returned in the closing direction by the urging spring 15, so that the rotatable barrier 2 is non-rotatably fixed. In this state, the camera is not usable.

Incidentally, the present invention can also be applied to various types of cameras such as single-lens reflex cameras, lens shutter cameras or video cameras, optical apparatuses other than such cameras, apparatuses other than the optical apparatuses, apparatuses applied to the cameras or the optical or other apparatuses, or elements which constitute part of such apparatuses.

As is apparent from the above description, in the arrangement of the above-described embodiment, when an opening/closing member of the camera, such as the aforesaid rotatable barrier, is fully opened, part of the body of the opening/closing member is brought into abutment with an external appearance member of the camera. Accordingly, the holding of the opening/closing member is accomplished by not only a bearing portion but also the external appearance member of the camera and the opening/closing member, such as the rotatable barrier, can stably be held in a fully open state.

In addition, since the opening/closing member is held by the external appearance member provided on the front of the camera, it is not necessary to newly provide a dedicated holding portion.

In addition, since the rotating shaft is inclined with respect to the longitudinal direction of the camera, it is easy in terms of layout to arrange a barrier so that the barrier is held by the external appearance member provided on the front of the camera in the above-described manner.

In addition, the opening/closing member, such as the rotatable barrier, includes a cushion member, such as a cushioning rubber member provided at a position away from the rotating shaft of the opening/closing member, and the cushion member is arranged to strike on part of the front cover, so that the impact of the opening operation of the opening/closing member can be cushioned.

In addition, since the opening/closing member is arranged to strike on a projecting surface portion of the external appearance member, such as the front cover of the camera, which constitutes a display portion impressed with the name of the camera or the like, the destruction resistance of the opening/closing member increases. Accordingly, even if an external force which causes the opening/closing member to move further in the opening direction from its opening stop position is applied to the opening/closing member, destruction of the opening/closing member can be prevented.

In addition, since the rotation of the opening/closing member is stopped by making use of the flat projecting surface portion of a surface impressed with the name of the camera or the like, which surface is provided on the front cover formed by a cubic surface, the stop accuracy of the opening/closing member at the rotation stop position thereof can be made far higher. Accordingly, the margin of the angle of flash illumination is reduced and flash light is concentrated more highly to increase the amount of light to be projected onto a subject, so that it is possible to improve the photographic quality of photographs to be taken during photography using the flash device.

(Second Embodiment)

Figure 8:
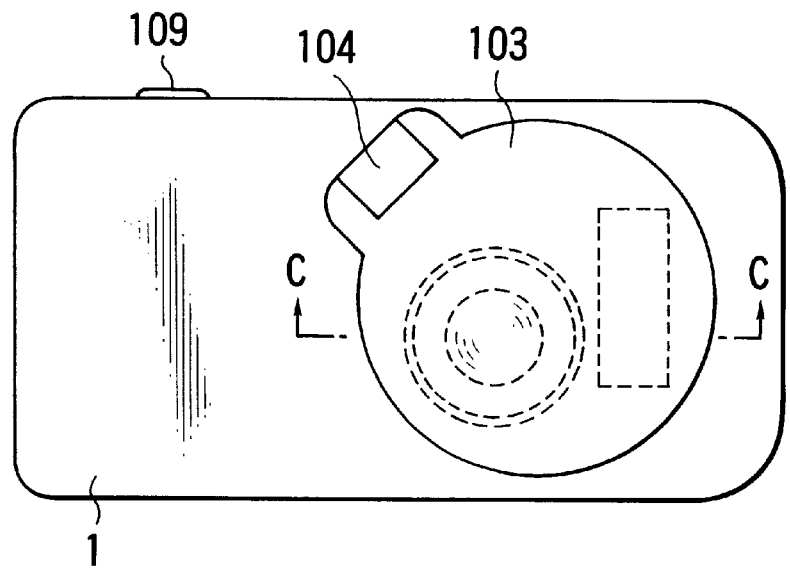
FIG. 8 is a front elevational view showing the portable state of a camera according to a second embodiment of the present invention.
Figure 9:
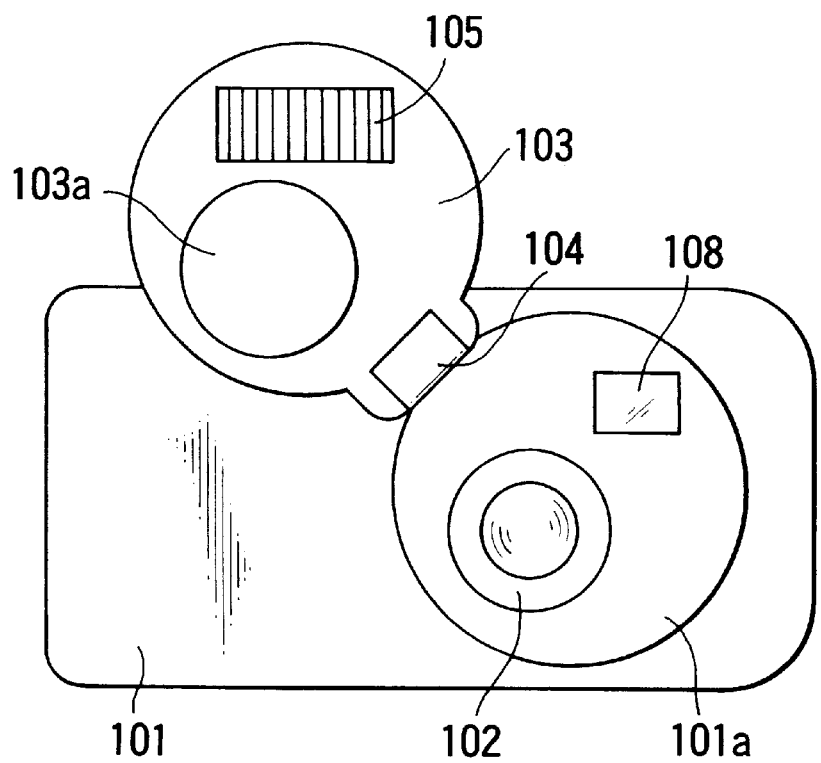
FIG. 9 is a front elevational view showing the photographing state of the camera according to the second embodiment of the present invention.
Figure 10:
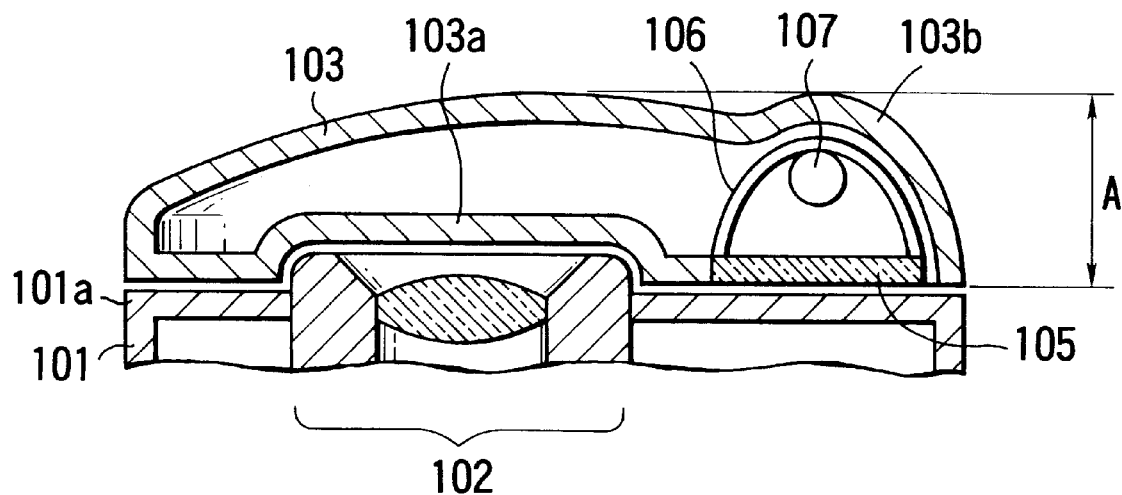
FIG. 10 is a cross-sectional view taken along line C—C of FIG. 8, showing the essential portion of the camera, which is in the state shown in FIG. 8, according to the second embodiment of the present invention.

FIGS. 8 to 10 show a second embodiment of the present invention.

FIG. 8 is a front elevational view showing the portable state of a camera according to the second embodiment of the present invention (a state in which a lens cover including a built-in flash device is closed), FIG. 9 is a front elevational view showing the photographing state of the camera (a state in which the lens cover including the built-in flash device is opened), and FIG. 10 is a cross-sectional view taken along line C—C of FIG. 8, showing the essential portion of the camera which is in the state shown in FIG. 8.

The camera shown in FIGS. 8 to 10 includes a camera body 101, a photographing lens barrel 102 which projects from a lens-barrel surrounding surface 101a of the camera body 101 in a retracted state, and a lens cover 103 which is arranged to spring up by turning about a hinge 104 obliquely upwardly at an angle of 45°. A spring (not shown) which urges the lens cover 103 in the opening direction is provided in the hinge 104. A recess portion 103a is provided in the internal side of the lens cover 103 so that the recess portion 103a can cover the projection of the photographing lens barrel 102 which is retracted when the camera is in the portable state with the lens cover 103 closed.

The lens cover 103 is provided with a flash-device Fresnel lens 105 which is exposed toward a subject side when the camera is in the photographing state with the lens cover 103 opened. The flash-device Fresnel lens 105, a flash reflector 106 and a xenon tube (flash emission tube) 107 constitute a flash emission part. The flash emission part is provided at a position which is displaced from the recess portion 103a provided in the internal side of the lens cover 103, i.e., at a position which is displaced from the photographing lens barrel 102 which projects from the lens-barrel surrounding surface 101a of the camera body 101 when the lens cover 103 is closed. The external appearance of the lens cover 103 includes a bulge 103b for accommodating the flash emission part, and the portion of the bulge 103b of the lens cover 103 can be made approximately as thick as the central thick portion of the lens cover 103 (in FIG. 10, a dimension A). The central thick portion of the lens cover 103 contains the space required to accommodate components associated with the flash device. Recess portion 103a provides part of the boundary for such space (compartment). Incidentally, the camera body 101 also includes a viewfinder objective window 108 and a release button 109.

In operation, if a lens cover opening button (not shown) is pressed when the lens-barrel surrounding surface 101a and the internal surface of the lens cover 103 are closely opposed to each other with the recess portion 103a of the lens cover 103 covering the projection of the photographing lens barrel 102 which is in the retracted state in which the lens cover 103 is closed as shown in FIG. 8, a lock member (not shown) which holds the lens cover 103 in the closed state thereof moves in an engagement releasing direction and the lens cover 103 is released from the closed state. Then, the lens cover 103 which is urged in an opening direction by an opening spring (not shown) turns about the hinge 104 obliquely upwardly at an angle of 45°, as shown in FIG. 9, and springs up to a position at which an appropriate angle of flash illumination can be obtained. When the lens cover 103 is moved to that position, the flash emission part is located at the highest position of the camera in the state of being most distant from a photographing-lens optical axis within the lens cover 103. Accordingly, it is possible to efficiently mitigate a red-eye phenomenon from occurring during flash photography of a subject person.

If the lens cover 103 is to be closed, it may be manually closed against the spring force of the opening spring.

Incidentally, although in the second embodiment the flash emission part is a constituent element which determines the thickness of the lens cover, such constituent element is not limited to the flash emission part, and may also be a mechanical component which constitutes the peripheral part of the hinge, an electrical mounted component associated with the flash device, or other component.

(Third Embodiment)

Figure 11:
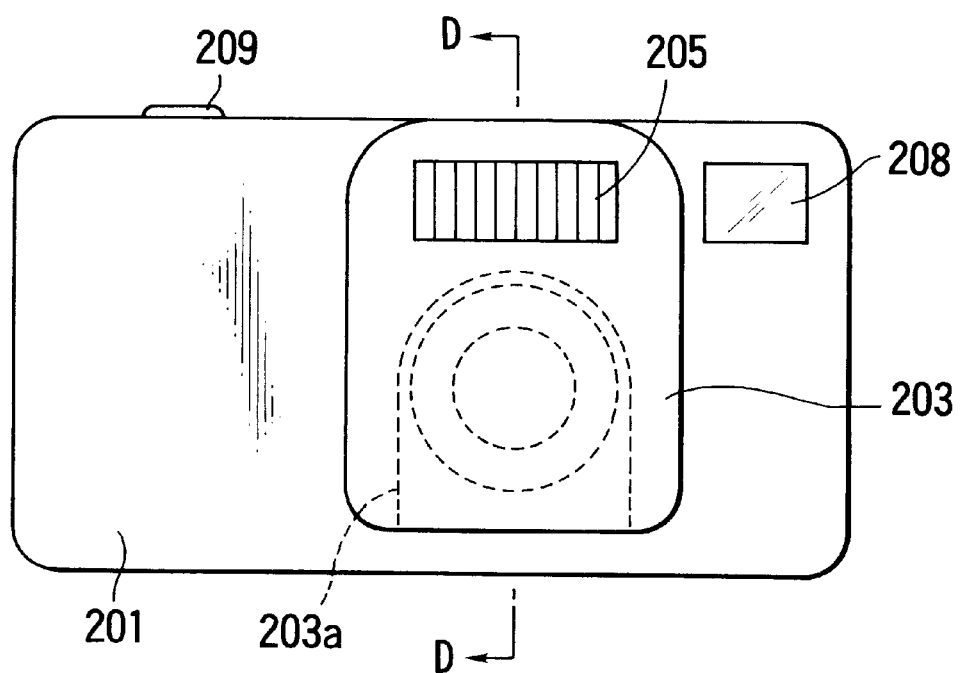
FIG. 11 is a front elevational view showing the portable state of a camera according to a third embodiment of the present invention.
Figure 12:
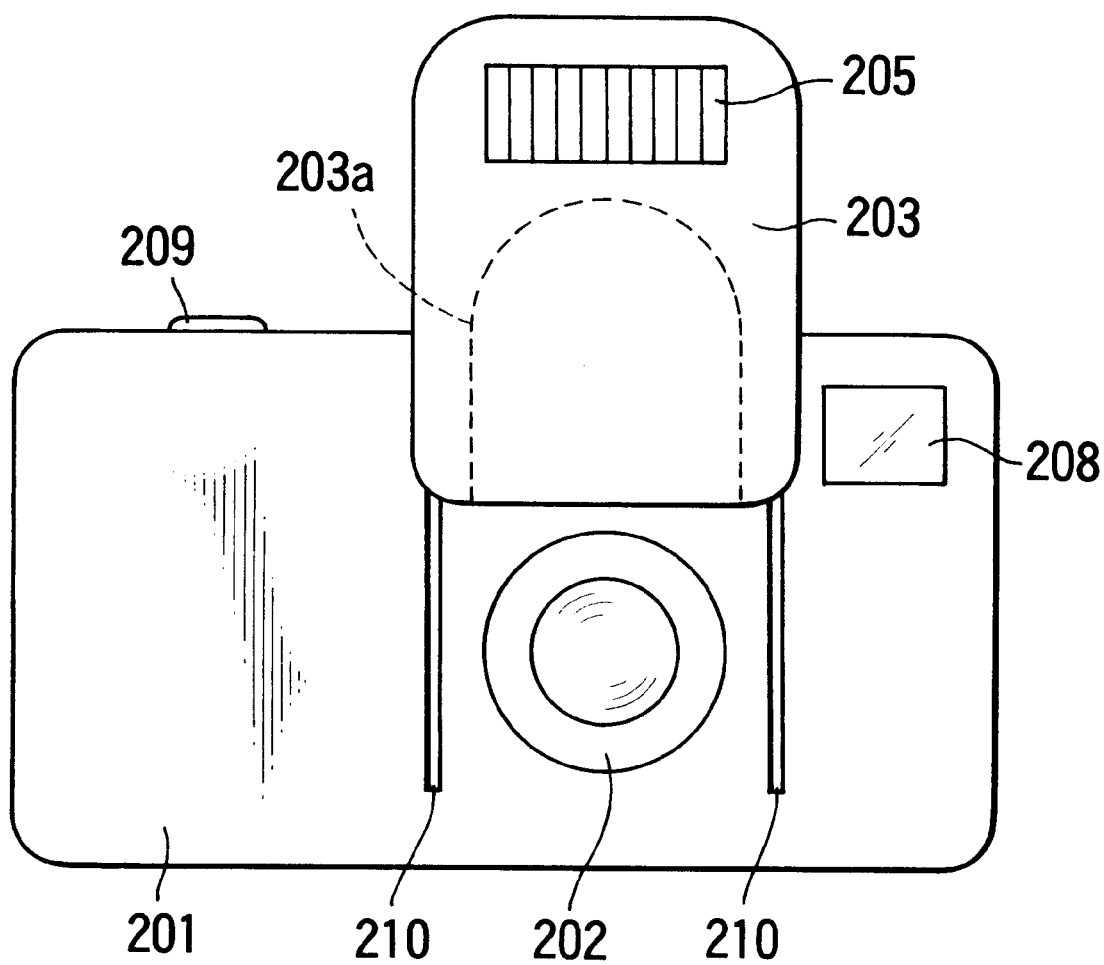
FIG. 12 is a front elevational view showing the photographing state of the camera according to the third embodiment of the present invention.
Figure 13:
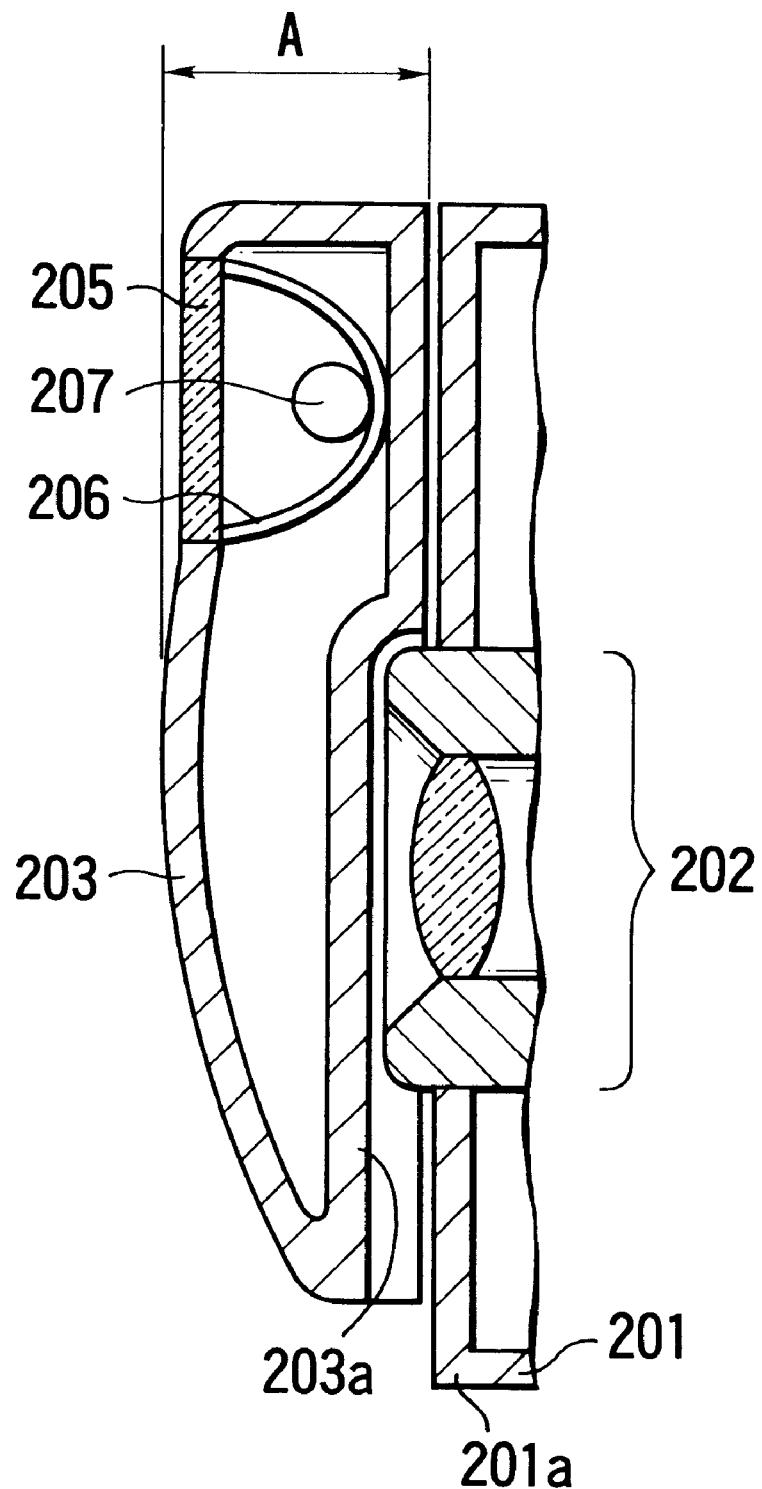
FIG. 13 is a cross-sectional view taken along line D—D of FIG. 11, showing the essential portion of the camera which is in the state shown in FIG. 11.

FIGS. 11 to 13 show a third embodiment of the present invention.

FIG. 11 is a front elevational view showing the portable state of a camera according to the third embodiment of the present invention (a state in which a lens barrel is covered by a lens cover including a built-in flash device), FIG. 12 is a front elevational view showing the photographing state of the camera (a state in which the lens cover including the built-in flash device is moved and the lens barrel is exposed), and FIG. 13 is a cross-sectional view taken along line D—D of FIG. 11, showing the essential portion of the camera which is in the state shown in FIG. 11.

In those figures, portions which are identical in function to those of the second embodiment are respectively denoted by reference numerals each of which is obtained by adding 100 to the corresponding one of the reference numerals used in the description of the second embodiment. Only different portions will be described below. As shown in FIG. 12, during photography, a slide type of lens cover 203 slides upwardly of the camera and exposes a photographing lens barrel 202, and a flash emission part (a flash-device Fresnel lens 205) also moves upwardly. A recess portion 203a provided in the internal side of the lens cover 203 has a U-like shape which is opened downwardly so that the lens cover 203 can move upwardly past the projection of the photographing lens barrel 202 which is retracted.

Rails 210 for the lens cover 203 are provided in a camera body 201, and the lens cover 203 is provided with slide members (not shown) such as rollers which are held on and guided along the rails 210.

As shown in FIG. 13, the flash emission part built in the lens cover 203 can be made approximately as thick as the central thick portion of the lens cover 203 (in FIG. 13, a dimension A). The central thick portion of the lens cover 203 contains the space required to accommodate components associated with the flash device.

In operation, if a lens cover opening button (not shown) is pressed when the lens cover 203 is closed, a lock member (not shown) which holds the lens cover 203 in the closed state thereof moves in an engagement releasing direction and the lens cover 203 is released from the closed state. Then, as shown in FIG. 12, the lens cover 203 which is urged in an opening direction by an opening spring (not shown) slides upwardly of the camera, exposes the photographing lens barrel 202 and springs up to a position at which an appropriate angle of flash illumination can be obtained. When the lens cover 203 is moved to that position, the flash emission part is located at the highest position of the camera in the state of being most distant from a photographing-lens optical axis within the lens cover 203. Accordingly, it is possible to efficiently mitigate a red-eye phenomenon from occurring during flash photography of a subject person.

If the lens cover 203 is to be closed, it may be manually closed against the spring force of the opening spring.

Incidentally, although in the third embodiment the flash emission part is a constituent element which determines the thickness of the lens cover, such constituent element is not limited to the flash emission part, and may also be mechanical components which constitute the slide members which are held on and guided along the rails, an electrical mounted component associated with the flash device, or other component.

As is apparent from the above description, with the arrangement of each of the second and third embodiments, it is possible to reduce the thickness of the lens cover and hence the thickness of the camera.

Furthermore, in addition to the reduction in such thickness, it is possible to achieve the effect of mitigating a red-eye phenomenon.

Incidentally, the present invention can also be applied to various types of cameras such as single-lens reflex cameras, lens shutter cameras or video cameras, optical apparatuses other than such cameras, apparatuses other than the optical apparatuses, apparatuses applied to the cameras or the optical or other apparatuses, or elements which constitute part of such apparatuses.

I claim:

1. A camera comprising:

a photographing optical system; and a cover for covering said photographing optical system, said cover being supported turnably about a rotating axis which is neither parallel nor perpendicular to a longitudinal direction of a camera body, and being operative to selectively open and close by turning about the rotating axis.

2. A camera according to claim 1, further comprising a flash device used for flash photography, said flash device being provided in said cover.

3. A camera according to claim 2, wherein said cover includes a surface portion which is at least capable of facing the camera body when said cover is in a closed state, and of facing in a forward direction when said cover is in an opened state, said flash device being provided in the surface portion.

4. A camera according to claim 3, wherein said flash device is disposed at a position which does not overlap said photographing optical system when said cover is in the closed state.

5. A camera according to claim 4, wherein said cover includes a recess portion provided in the surface portion for accommodating said photographing optical system when said cover is in the closed state, said flash device being disposed at a position different from that of said recess portion.

6. A camera according to claim 5, wherein when said cover is in the opened state, said flash device is disposed at a position more distant from said photographing optical system than is said recess portion.

7. A camera according to claim 1, wherein said cover includes a surface portion which is at least capable of facing the camera body when said cover is in a closed state, and of facing in a forward direction when said cover is in an opened state.

8. A camera according to claim 1, wherein said cover includes means for supporting said cover turnably about a rotating axis substantially parallel to a front surface of said camera.

9. A camera according to claim 1, wherein said cover includes an abutment portion which comes into abutment with part of a front exterior portion of said camera when said cover is in a predetermined opened state, said cover being positioned in the predetermined opened state by the abutment of said abutment portion.

10. A camera according to claim 9, wherein said cover includes a projecting portion as said abutment portion.

11. A camera according to claim 9, wherein said abutment portion is provided in a portion which faces in a forward direction of said camera when said cover is in a closed state and faces part of the front exterior portion of said camera when said cover is in an opened state.

12. A camera according to claim 9, wherein said abutment portion is provided on a back side of a surface which faces the camera body when said cover is in a closed state.

13. A camera according to claim 9, further comprising an abutment receiving portion which is provided on the camera body and with which said abutment portion comes into abutment.

14. A camera according to claim 13, wherein said abutment receiving portion includes a flat portion with which said abutment portion comes into abutment.

15. A camera according to claim 1, wherein:

the distance between the cover and a release operation portion under the cover opening state is shorter than the distance between the cover and the release operation portion under the cover closing state in both directions parallel and vertical to the lengthwise direction of the camera.

16. A camera having a front surface having a top end, said camera comprising:

a photographing optical system;

a cover which covers said photographing optical system and which has a recess portion for accommodating part of said photographing optical system which partially projects from a camera body and being operative to selectively open and close by turning about a member supported on said front surface of said camera body and inclined relative to said top end of said front surface, the distance between the cover and a release operation portion under the cover opening state is shorter than the distance between the cover and the release operation portion under the cover closing state in both directions parallel and vertical to the lengthwise direction of the camera; and a flash device for flash photography, provided in said cover, said flash device being disposed at a position where a distance from said photographing optical system to said flash device is greater than a distance from said photographing optical system to said recess portion when said cover is in an opened state.

17. A camera according to claim 16, wherein said cover includes a surface portion which is at least capable of facing the camera body when said cover is in a closed state, and of facing in a forward direction when said cover is in the opened state, said flash device being provided in the surface portion.

18. A camera according to claim 16, wherein said cover includes means for supporting said cover turnably about a rotating axis substantially parallel to a front surface of said camera.

19. A camera according to claim 15, wherein said cover includes an abutment portion which comes into abutment with part of a front exterior portion of said camera when said cover is in a predetermined opened state, said cover being positioned in the predetermined opened state by the abutment of said abutment portion.

20. A camera comprising:

a photographing optical system; and a cover for covering said photographing optical system, said cover being operative to selectively open and close by turning and being positioned at a predetermined turning position where said cover is placed in an opened state, by coming into abutment with at lease part of a front surface of a camera body, the cover having a member integrated therewith and extending outwardly of said cover and engaging the front surface of the camera body when the cover is positioned in an open state, the cover rotating around an axis inclined relative to the lengthwise direction of the camera.

21. A camera according to claim 20, wherein said cover turns about a predetermined turning shaft which is positioned inwardly from an edge of the front surface of said camera.

22. A camera according to claim 20, wherein said cover includes an abutment portion provided in a portion which faces in a forward direction of said camera when said cover is in a closed state and faces part of a front exterior portion of said camera when said cover is in the opened state.

23. A camera according to claim 20, wherein said abutment portion is provided on a back side of a surface which faces the camera body when said cover is in a closed state.

24. A camera according to claim 20, wherein said cover is supported turnably about a rotating axis which is neither parallel nor perpendicular to a longitudinal direction of a camera body, and is operative to selectively open and close by turning about the rotating axis.

25. A camera according to claim 20, wherein said cover includes means for supporting said cover turnably about a rotating axis substantially parallel to a front surface of said camera.

26. A camera according to claim 20, further comprising a flash device used for flash photography, said flash device being provided in said cover.

27. A camera according to claim 20, wherein said cover turns about a predetermined rotating axis, said cover being positioned at the predetermined turning position by only the predetermined rotating axis and the abutment.

28. A camera according to claim 20, wherein:

the distance between the cover and a release operation portion under the cover opening state is shorter than the distance between the cover and the release operation portion under the cover closing state in both directions parallel and vertical to the lengthwise direction of the camera.

* * * * *

UNITED STATES PATENT AND TRADEMARK OFFICE
CERTIFICATE OF CORRECTION

PATENT NO. : 5,987,263
DATED : November 16, 1999
INVENTOR(S) : Yasuhiro Toyoda, et al.

It is certified that error appears in the above-identified patent and that said Letters Patent are hereby corrected as shown below:

Col. 10, line 51, delete "claim 15" and insert -- claim 16 --.

Signed and Sealed this

Seventeenth Day of April, 2001

Attest:

NICHOLAS P. GODICI

*Attesting Officer*  *Acting Director of the United States Patent and Trademark Office*